United States Patent
Qiu et al.

(10) Patent No.: US 9,853,844 B2
(45) Date of Patent: Dec. 26, 2017

(54) CIRCUITS AND METHODS FOR FREQUENCY OFFSET ESTIMATION IN FSK COMMUNICATIONS

(71) Applicant: Texas Instruments Incorporated, Dallas, TX (US)

(72) Inventors: Wenxun Qiu, Allen, TX (US); Timothy Mark Schmidl, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/656,039

(22) Filed: Jul. 21, 2017

(65) Prior Publication Data

US 2017/0324595 A1 Nov. 9, 2017

Related U.S. Application Data

(63) Continuation of application No. 15/003,181, filed on Jan. 21, 2016, now Pat. No. 9,722,833.

(60) Provisional application No. 62/154,507, filed on Apr. 29, 2015.

(51) Int. Cl.
*H03D 3/00* (2006.01)
*H04L 27/16* (2006.01)
*H04L 27/14* (2006.01)

(52) U.S. Cl.
CPC .............. *H04L 27/16* (2013.01); *H04L 27/14* (2013.01)

(58) Field of Classification Search
CPC ... H04B 1/1027; H04L 27/0014; H04L 27/22; H04L 27/2662; H04L 2027/0024; H04L 27/14; H04L 27/2017; H04L 27/16; H04L 7/0331; H04L 27/142; H04L 2027/0095; H04L 27/2332; H04L 27/01; H03L 2207/50; H03L 7/0814
See application file for complete search history.

(56) References Cited

U.S. PATENT DOCUMENTS

| | | | |
|---|---|---|---|
| 6,038,267 A * | 3/2000 | Oura | H04L 1/06 329/304 |
| 2004/0146122 A1 | 7/2004 | Fague et al. | |
| 2005/0013389 A1 | 1/2005 | Mizukami | |
| 2007/0133715 A1 | 6/2007 | Juang | |
| 2009/0212835 A1* | 8/2009 | Xu | H03L 7/1974 327/156 |
| 2012/0027147 A1* | 2/2012 | Ray | H04L 27/2647 375/359 |

(Continued)

*Primary Examiner* — Khanh C Tran
(74) *Attorney, Agent, or Firm* — Kenneth Liu; Charles A. Brill; Frank D. Cimino

(57) ABSTRACT

Disclosed embodiments include a receiver having an input that receives a frequency shift key (FSK) signal having a preamble comprising preamble symbols, a phase compensator that applies a compensation vector to one of first and second samples of a first preamble symbol, wherein applying the compensation vector to the one of the first and second samples produces a compensated sample, a demodulator that determines a phase offset between the compensated sample and the other one of the first and second samples of the first preamble symbol, and a frequency offset mapper that determines a frequency offset based at least upon the phase offset. The receiver applies the frequency offset to the FSK signal.

20 Claims, 3 Drawing Sheets

(56) References Cited

U.S. PATENT DOCUMENTS

| | | | | |
|---|---|---|---|---|
| 2012/0212290 A1* | 8/2012 | Hafuka | ............... | H04L 27/14 329/303 |
| 2014/0023164 A1* | 1/2014 | Oh | ............... | H04L 27/14 375/334 |
| 2015/0222464 A1* | 8/2015 | Liu | ............... | H04L 27/22 375/327 |
| 2015/0280841 A1* | 10/2015 | Gudovskiy | ............... | H04B 17/20 375/226 |

* cited by examiner

CIRCUITS AND METHODS FOR FREQUENCY OFFSET ESTIMATION IN FSK COMMUNICATIONS

This application is a continuation of and claims priority to U.S. patent application Ser. No. 15/003,181, filed Jan. 21, 2016, which claims the benefit of U.S. provisional patent application 62/154,507 of Wenxun Qiu filed on Apr. 29, 2015 for A NEW METHOD OF FREQUENCY OFFSET ESTIMATION FOR FSK, the entireties of which are incorporated by reference herein.

BACKGROUND

In frequency shift key (FSK) communication systems, the transmitting frequency and the receiving frequency have to be the same for optimal performance. Due to anomalies, such as the crystal differences between a transmitter and a receiver, the frequencies may be different, which results in communication errors.

SUMMARY

A frequency shift key (FSK) receiver includes a phase compensator for compensating for frequency differences in a transmitter that transmits a FSK signal to the receiver. The phase compensating is performed before the FSK signal is demodulated by the receiver.

DETAILED DESCRIPTION

Communication systems require a transmitter node and a receiver node operating on the the same frequencies. When the frequencies are offset from one another, errors in the communications will occur. In some examples, crystals in the transmitter and receiver nodes are slightly different, which results in frequency offsets. Frequency compensation is applied in the receiver in many situations to compensate for the frequency offsets. For example, components within the receiver estimate the frequency offset and compensate for the frequency offset accordingly.

Figure 1A:
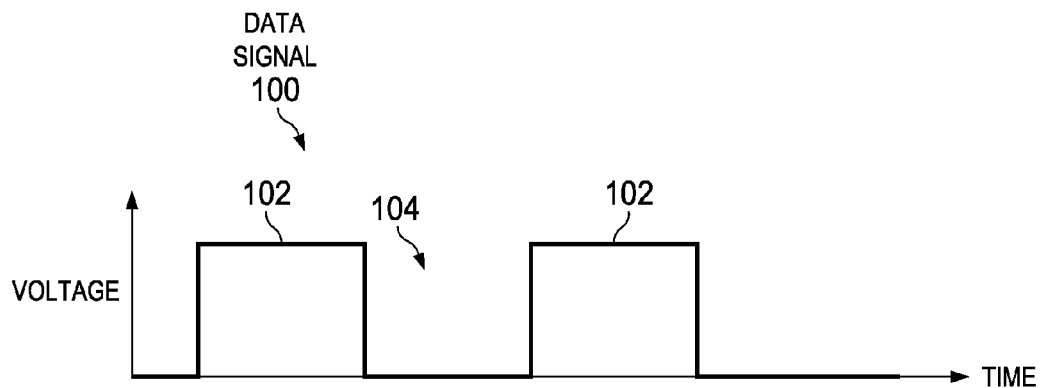
FIG. 1A is a graph showing an example of data that is to be transmitted by FSK modulation.
Figure 1B:
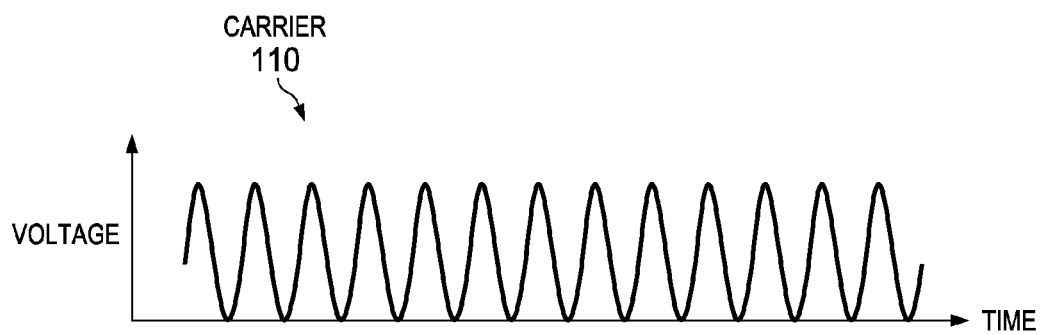
FIG. 1B is a graph showing an example of a carrier signal for transmitting the data of FIG. 1A.
Figure 1C:
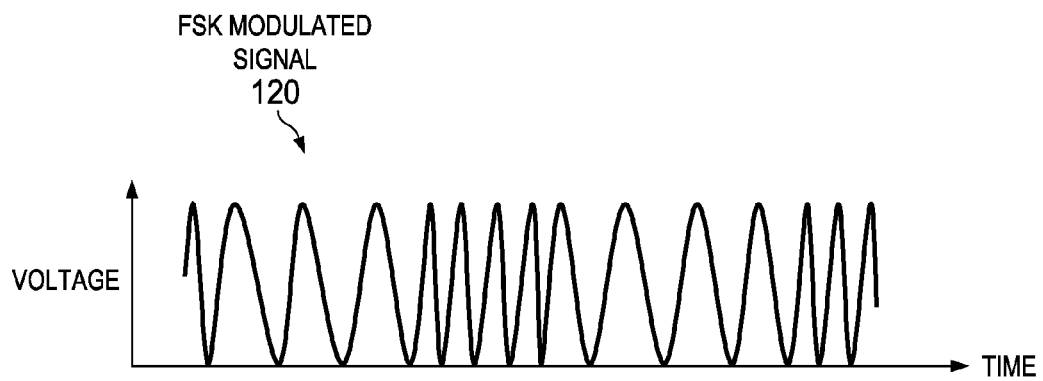
FIG. 1C is a graph showing the data of FIG. 1A after FSK modulation.

One communication system where frequency compensation is applied is in frequency shift key (FSK) signaling or modulation. FIGS. 1A-1C illustrate an example of FSK modulation. FIG. 1A is a digital signal 100 that is to be transmitted by FSK communications. The digital signal 100 consists of logic one bits 102 and logic zero bits 104. FIG. 1B is a carrier signal 110 for the digital signal 100. In the examples described herein, the carrier signal 110 is a sine wave having a frequency that meets the Nyquist requirements for the digital signal 100. FIG. 1C is a FSK signal 120 of the digital signal 100. The FSK signal 120 has an increased or positive frequency relative to the carrier signal 110 representing the zero bits 104 and a decreased or negative frequency relative to the carrier signal 110 representing the one bits 102. In some alternative examples, the mapping is reversed so that a zero bit corresponds to a negative frequency and a one bit corresponds to a positive frequency.

During FSK communications, a preamble is transmitted to the receiver. The preamble contains repetitive "01010101" bit patterns that can be used to perform frequency offset estimations. The bits are sometimes referred to as symbols in FSK communications. In the following example, the input sample rate is four times that of the FSK symbol rate. More specifically, the symbols or bits are sampled at a rate that is four times faster than the symbol or bit rate, which is referred to as a four times oversampling. Due to the four times oversampling and because the input data can start from anywhere inside a preamble repetition, the receiver needs to search eight consecutive locations in the preamble to find the best sample phase for a zero bit. In order to distinguish between a zero bit and a one bit, there are eight possible sampling phases (eight samples on two bits). It is noted that due to pulse-shaping in the transmitter, the phase difference between two samples may not be the same even for the 4 samples in a single bit. The best sample phase is detected by the largest phase difference between samples. In some examples, the average of a certain number of preamble bits is averaged to find the largest phase difference for a zero bit or a one bit.

In the following example, it is assumed that a synchronization module has already found the starting sample phase of a zero bit in the preamble. A demodulator in the receiver calculates the phase rotation between two adjacent samples per equation (1) as follows:

$$Y_N = a\tan 2(\text{imag}(X_N * \text{conj}(X_{N-1})), \text{real}(X_N * \text{conj}(X_{N-1}))) \quad \text{Equation (1)}$$

where a tan 2 is a four quadrant arctangent function that returns a value within $-\pi$ and $\pi$, $Y_N$ is the output for the Nth input sample $X_N$, and $X_{N-1}$ is the previous input sample. Functions other than a tan 2 that return or identify angles as known by those skilled in the art may be used in place of equation (1).

In examples where an FSK communication has a modulation index of one and four times oversampling versus the symbol rate, the nominal phase differences between adjacent samples are $+/-\pi/4$, depending on the instantaneous frequency being positive or negative. In some examples, positive instantaneous frequencies render an increasing phase of $+\pi/4$ from one sample to the next. Negative instantaneous frequencies render a decreasing phase of $-\pi/4$ from one sample to the next. For ease of discussion, it is assumed that zero bits map to a positive frequency and the phase difference between adjacent samples in zero bits maps to $+\pi/4$. One bits map to a negative frequency, so the phase difference between adjacent one bit samples maps to $-\pi/4$. In the example of Gaussian frequency shift keying (GFSK), Gaussian filtering is applied so the demodulator output for samples at the beginning and end of a symbol period have absolute values that are less than $\pi/4$. In examples where the modulation index is 0.5, the phase difference is half of the value versus the examples with a modulation index of one. Accordingly, the phase differences are $+/-\pi/8$.

In order to make the frequency offset estimation more accurate, only two samples are used for each bit or FSK symbol to perform the phase differentiation. Phase differentiation is a determination of the phase difference between two samples on the same FSK symbol or bit. The samples are taken near the middle of the bits for maximum phase differentiation. The samples are then demodulated by a demodulator. The output $D_K$ of the demodulator is defined by equation (2) as follows:

$$D_k = Y_{4k+2} \qquad \text{Equation (2)}$$

Due to the repetitive zero/one bit pattern in the preamble, the demodulator output $D_k$ should alternate between +45 degrees (+π/4) and −45 degrees (−π/4). Because there are an equal number of ones and zeros in the preamble, the sum of all the demodulator outputs $D_k$ in an integer number of preamble repetitions should ideally equal zero.

When there is a carrier frequency offset, the demodulator output $D_k$ will contain a constant phase rotation between adjacent samples. For example, in a 50 ksps FSK, a 60 ppm frequency offset for a 928 MHz carrier results in about 55.7 kHz frequency offset. This frequency offset translates into a phase rotation of about one-hundred degrees between consecutive samples at the four times sample rate described above.

Figure 2A:
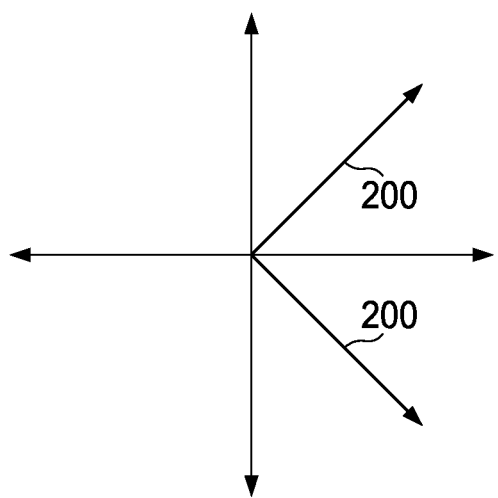
FIG. 2A is a graph showing a FSK demodulator output without a frequency shift.
Figure 2B:
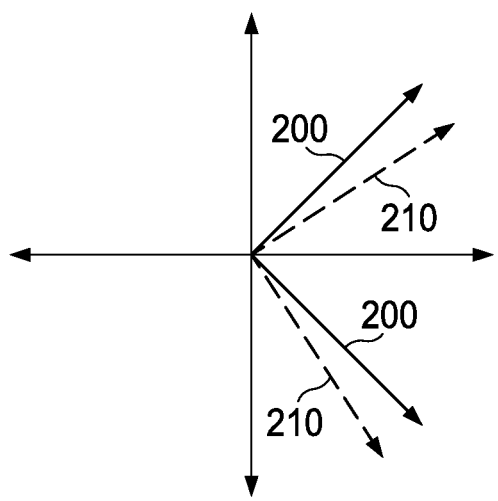
FIG. 2B is a graph showing a FSK demodulator output with and without a frequency shift.

FIG. 2A is a graph showing demodulator outputs 200 derived from equation (2) without a carrier frequency offset. As described above, the demodulator outputs are approximately +45 degrees and −45 degrees without frequency offsets. FIG. 2B shows the demodulator outputs 200 in addition to outputs 210 resulting from a frequency offset at the demodulator input. As shown in FIG. 2B, the outputs 210 have undergone a phase rotation or phase offset due to the frequency offset. The phase rotation causes a nonzero value (phase offset) in the mean of all the modulator outputs $D_k$ in the preambles. Since the phase offset or rotation is proportional to the amount of frequency offset, the phase offset can be used to estimate the frequency offset. The frequency offset and the phase offset have a close-to-linear relationship. In many examples, the demodulator output $D_k$ is averaged over a plurality of preamble repetitions so that the mean phase offset ($P_0$) may be used for frequency offset estimation. Mathematically, the mean phase offset $P_0$ is calculated by equation (3) as follows:

$$P_0 = \text{mean}(D_k) \qquad \text{Equation (3)}$$

The frequency offset is sometimes referred to as a frequency offset estimation and is equal to a constant multiplied by the mean phase offset $P_o$ as shown by equation (4) as follow:

$$\text{Frequency Offset} = \text{constant} * P_0 \qquad \text{Equation (4)}$$

The constant, which may be a constant scalar, can be determined by curve fitting. For example, a 50 ksps FSK signal operating at a four times sampling rate has a constant that is equal to 34.17, which is determined by a curve-fitting simulation.

In some situations, noise causes the output (phase difference) of the demodulator to be greater than 180 degrees, which provides a poor frequency offset estimation. With regard to the examples described above, a 50 ksps FSK having a modulation index of 1.0 with 40 ppm frequency offset at 928 MHz has a phase rotation between two adjacent samples that is up to 111.8 degrees. In a high noise scenario, the phase rotation between two adjacent samples can easily go beyond 180 degrees. As described above, the a tan 2 function operates in the demodulator, so the output wraps to π, which invalidates the frequency offset estimation result.

The circuits and methods described herein improve the frequency offset estimation by reducing the probability of the a tan 2 calculation, or a calculation based on a similar function, overflowing. More specifically, the circuits and methods provide for frequency offset compensation that does not cause the a tan 2 function to exceed n. In summary, phase compensation is performed before the preamble samples are used to determine the frequency offset estimation. The phase compensation partially or entirely removes the constant phase change of the FSK signal between two consecutive samples, which reduces the probability of the a tan 2 calculation overflowing. Therefore, the frequency offset estimation is improved, especially in low signal-to-noise ratio operating conditions. In some examples, a phase compensation module is provided to compensate the preamble signals before demodulation.

The circuits and methods described herein provide improvement for frequency offset estimation, including in low signal to noise ratio (SNR) environments. The examples described herein have a modulation index of 1.0, but the algorithms described herein are applicable to other modulation indices. In addition, the following examples map zero bits to a positive frequency and map one bits to a negative frequency. Ignoring any frequency offset, in the four samples of zero bits, each sample rotates 45 degrees from its previous sample, while in the four samples of the one bits, each sample rotates −45 degrees from its previous sample. This ±45 degree rotation is without any frequency offset, so the average is calculated over multiple preambles and cancels to zero. Because the average cancels to zero, it is not relevant to the frequency offset estimation. However, it still reduces the margin of the a tan 2 function and makes it easier or more likely to get an overflow from −π to π.

The circuits and methods described herein reduce the impact of the constant phase rotation from the FSK signal itself, providing more headroom for $D_k$ and $P_0$ calculation for the frequency offset. These circuits and methods reduce the probability of overflowing the a tan 2 function, which provides more accurate frequency offset estimation.

Figure 3:
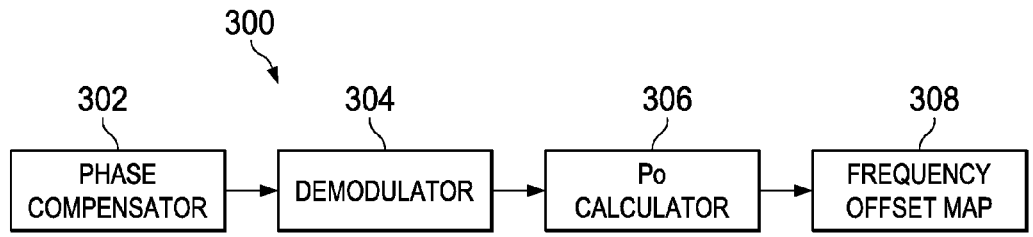
FIG. 3 is a block diagram of an example FSK receiver.

FIG. 3 is a block diagram of an example FSK receiver 300 that provides improved frequency offset estimation. The receiver may be fabricated from individual components or it may be fabricated as an integrated circuit. The receiver 300 includes a phase compensator 302, a demodulator 304, a mean phase offset ($P_0$) calculator 306, and a frequency compensation map 308. The phase compensator 302 calculates the phase difference between the middle two samples for each preamble bit of the received FSK signal. In order to reduce the constant phase change brought by the FSK signal itself, the phase of one of the two samples is rotated to compensate for all or some of the phase change. To compensate the later sample, the later sample is rotated towards the earlier sample. Equivalently, the earlier sample can be rotated towards the later sample. With regard to rotating the later sample, the demodulator functions as equations (5) and (6) as follows:

$$Z_N = X_N * C_i, \; i=0,1 \qquad \text{Equation (5)}$$

$$Y_N = a\tan 2(\text{imag}(Z_N * \text{conj}(X_{N-1})), \text{real}(Z_N * \text{conj}(X_{N-1}))) \qquad \text{Equation (6)}$$

where $C_i$ is the phase compensation vector. The compensation vector removes the constant phase partially or entirely. For example, $C_i = e^{-jp}$, where p is the compensation phase shift, which is described below. $C_o$ is the phase compensation vector for zero bits and $C_1$ is the phase compensation vector for one bits. $C_0$ and $C_1$ are conjugates of each other so that they can be canceled when the demodulator output of several preamble bits are averaged. The value of the compensated phase shift can be any value between 0 and $\pi/4$ for FSK signals with modulation indices of 1. For modulation indices of 0.5, the compensated phase shift is between 0 and $\pi/8$. The remaining algorithms are the same as prior algorithms described in equations (2)-(4) to calculate the frequency offset.

In one example a 50 ksps FSK signal with a modulation index of 1 is analyzed. Ignoring frequency offset, the adjacent samples have a +45 degree phase difference for zero bits, and a −45 degree phase difference for one bits. The compensation vectors are set as $C_0=e^{-j\pi/8}$ and $C_1=e^{j\pi/8}$ which corresponds to the +45 degree and −45 degree phase differences. The phase difference is calculated on the compensated sample and the second sample for each preamble bit and averaged over 4 preamble bytes to obtain the mean phase offset $P_0$ for the frequency estimation. Once $P_0$ is determined, equation (4) is used to map the frequency offset estimation, which is applied to the FSK signal.

In some examples, the circuits and methods described herein are used for wireless smart utility networks operating in the 902-928 MHz ISM frequency bands. In this situation and others, oversampling rates of two times the FSK symbol rate or greater, such as four times or eight times the FSK symbol rate may be used. In some examples, the a tan 2 function can be replaced by any angle estimation function as known by those skilled in the art. Any FSK symbol rates can be used such as 50 ksps, 100 ksps, 150 ksps, 200 ksps, or 300 ksps. Modulation indices can be any integer plus fractional value such as 0.5, 0.75, 1.0, 1.5, and 2.0. This method can also be extended from 2 FSK to 4 FSK since the preamble is typically sent using only 2 constellation points.

Figure 4:
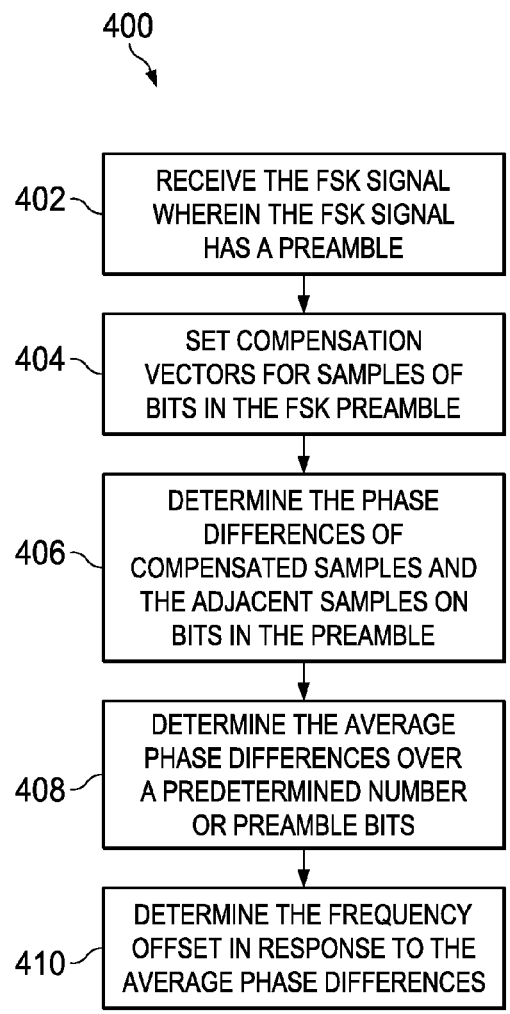
FIG. 4 is a flow chart describing a method of applying frequency offset to a FSK signal.

FIG. 4 is a flow chart 400 describing a method of applying frequency offset to a FSK signal. The flow chart 400 includes receiving the FSK signal whereby the FSK signal has a preamble in step 402. Step 404 includes setting compensation vectors for samples of bits in the FSK preamble. Step 406 includes determining the phase differences of compensated samples and the adjacent samples on bits in the preamble. Step 408 includes determining the average phase differences over a predetermined number of preamble bits. Step 410 includes determining the frequency offset in response to the average phase differences.

While some examples of FSK communications have been described in detail herein, it is to be understood that the inventive concepts may be otherwise variously embodied and employed and that the appended claims are intended to be construed to include such variations except insofar as limited by the prior art.

What is claimed is:

1. A receiver comprising:
an input that receives a frequency shift key (FSK) signal having a preamble comprising preamble symbols;
a phase compensator that applies a compensation vector to one of first and second samples of a first preamble symbol, wherein applying the compensation vector to the one of the first and second samples produces a compensated sample;
a demodulator that determines a phase offset between the compensated sample and the other one of the first and second samples of the first preamble symbol; and
a frequency offset mapper that determines a frequency offset based at least upon the phase offset;
wherein the receiver applies the frequency offset to the FSK signal.

2. The receiver as claimed in claim 1, wherein the input receives a number of samples of the first preamble symbol that is greater than two.

3. The receiver as claimed in claim 2, wherein each of the first sample and the second sample is neither the first received sample nor the last received sample of the greater than two received samples.

4. The receiver as claimed in claim 3, wherein the input sample rate of the receiver is greater than the symbol rate of the FSK symbol by a factor n, wherein n is an integer greater than two.

5. The receiver as claimed in claim 4, wherein the first and second samples are adjacent samples.

6. The receiver as claimed in claim 4, wherein n is equal to four, the greater than two received samples includes four samples of the first preamble symbol, and the first and second samples are the middle two samples of the four samples.

7. The receiver as claimed in claim 1, wherein applying the compensation vector at least partially compensates for a phase change between the first and second samples of the first preamble symbol caused at least partially to a carrier frequency offset in the FSK signal.

8. The receiver as claimed in claim 1, comprising a phase offset calculator that determines a mean phase offset based on an average of phase offset values determined by the demodulator for a predetermined number of preamble symbols, the determined phase offset corresponding to the first preamble symbol being included in the phase offset values used to determine the mean phase offset.

9. The receiver as claimed in claim 1, wherein the compensation vector is applied to the second sample and the demodulator determines the phase offset between the compensated second sample and the first sample in accordance with the following equation:

$$Y_N = a\tan 2(\text{imag}(Z_N^*\text{conj}(X_{N-1})), \text{real}(Z_N^*\text{conj}(X_{N-1})));$$

wherein $Y_N$ is the phase offset, $Z_N$ is the compensated second sample, and $X_{N-1}$ is the first sample.

10. A method comprising:
receiving a frequency shift key (FSK) signal including a preamble having bits, wherein, for each preamble bit, at least a first sample and a second sample of the preamble bit are received;
for each preamble bit:
applying a compensation vector to one of the first and second samples that at least partly compensates for phase change between the first and second samples, wherein applying the compensation vector to the one of the first and second samples produces a compensated sample and the other of the first and second samples is an uncompensated sample; and
demodulating the first and second samples to determine a phase offset between the compensated sample and the uncompensated sample;
determining a frequency offset based on a mean phase offset that is the average of determined phase offsets for a predetermined number of the preamble bits; and
applying the determined frequency offset to the FSK signal.

11. The method as claimed in claim 10, wherein the predetermined number of the preamble bits corresponds to four bytes.

12. The method as claimed in claim 10, wherein determining the frequency offset comprises mapping preamble bits having a first value to a positive frequency and preamble bits having a second value that is complementary to the first value to a negative frequency.

13. The method as claimed in claim 10, wherein, for preamble bit, more than two samples are sequentially received, wherein neither of the first sample and the second sample are the first of the sequentially received samples nor the last of the sequentially received samples.

14. The method as claimed in claim 13, wherein the more than two samples includes four samples, and the first and second samples are the middle two samples of the four samples.

15. The method as claimed in claim 13, wherein the first sample and the second sample are adjacent samples of the sequentially received samples.

16. The method as claimed in claim 10, wherein applying the compensation vector to one of the first and second samples comprises applying a first compensation vector when the preamble bit has a first value and applying a second compensation vector when the preamble bit has a second value.

17. The method as claimed in claim 16, wherein the first and second compensation vectors are conjugates of each other.

18. The method as claimed in claim 10, wherein the first value is 0 and the first compensation vector is $e^{-j\pi/8}$, and wherein the second value is 1 and the second compensation vector is $e^{j\pi/8}$.

19. A integrated circuit device comprising:
a receiver circuit that receives a frequency shift key (FSK) signal having a preamble, compensates a first sample of a preamble bit of the preamble, determines a phase offset between the compensated first sample and a second sample of the preamble bit, estimates a frequency offset based at least partially on the phase offset, and applies the frequency offset to the FSK signal.

20. The integrated circuit device of claim 19, wherein the receiver circuit receives a plurality of samples of the preamble bit in order, and wherein the first and second samples are not the initial or the last of the received plurality of samples.

* * * * *